C. F. BILLAU.

FRUIT AND FLOWER CUTTER.

APPLICATION FILED OCT. 8, 1913.

Reissued Nov. 11, 1913. 13,642.

WITNESSES

C. H. Reichenbach.

J. L. Willcutts

INVENTOR

Charles F. Billau

BY Munn & Co

ATTORNEYS

COLUMBIA PLANOGRAPH CO., WASHINGTON, D. C.

UNITED STATES PATENT OFFICE.

CHARLES FREDERICK BILLAU, OF CEDAR RAPIDS, IOWA.

FRUIT AND FLOWER CUTTER.

13,642. Specification of Reissued Letters Patent. Reissued Nov. 11, 1913.

Original No. 1,068,848, dated July 29, 1913, Serial No. 713,573. Application for reissue filed October 8, 1913. Serial No. 794,171.

*To all whom it may concern:*

Be it known that I, CHARLES F. BILLAU, a citizen of the United States, and a resident of Cedar Rapids, in the county of Linn and State of Iowa, have invented a new and Improved Fruit and Flower Cutter, of which the following is a full, clear, and exact description.

This invention relates generally to a cutting device adapted to be held on the finger, and more particularly, to one especially adapted for use in cutting fruit and flowers.

The principal object of my invention is the provision of a cutting device adapted to be placed on the finger, the body member of which is made of resilient material and in spiral form, there being an exterior cutter on the outer convolution and an interiorly projecting stop on the inner convolution, the said stop being adapted to be firmly engaged by the finger, and being so disposed relatively to the cutter that the cutting force exerted by the finger will react on the finger through the stop and cause the spiral to wind on the finger, thereby positively preventing the device from turning about the finger. It is also of some importance in the production of devices in this class that a simple structure be devised, thereby providing for low cost of manufacture and consequent low selling price.

Reference is to be had to the accompanying drawings forming part of this specification, in which similar characters of reference denote corresponding parts in all the views, and in which—

Figure 1:
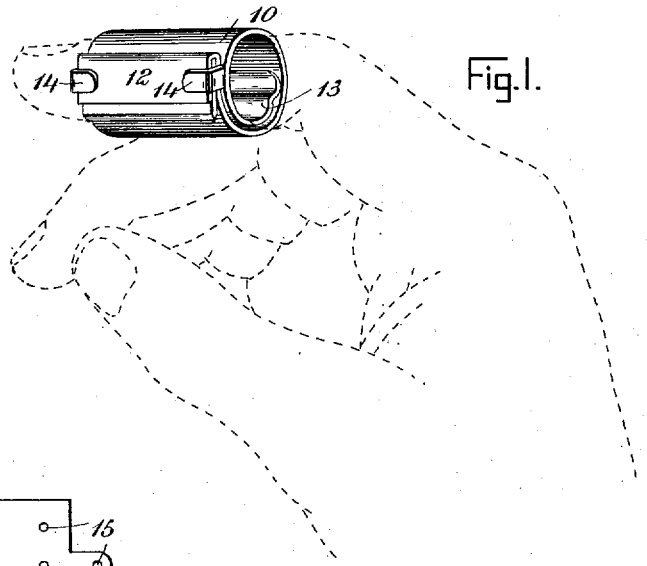
Figure 2:
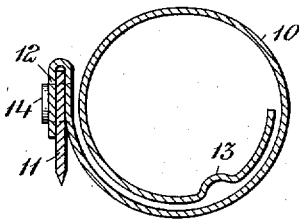
Figure 3:
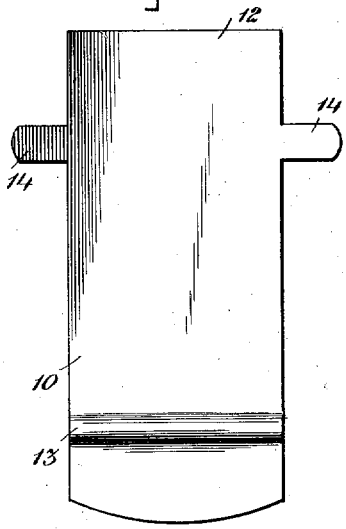

Figure 1 is a perspective view of the device in position on the index finger; Fig. 2 is a vertical sectional view of the device; Fig. 3 is a plan view of the blank from which the device is made; and Fig. 4 is a plan view of a modified form of blank.

The cutter comprises the body member 10 and the cutter blade 11 on the exterior of the body, with holding means for the blade, such holding means 12 being preferably integral with the body member 10. The body member 10 is preferably in the form of a single sheet of resilient material and adjacent one end is provided with a bearing portion which takes the form of a corrugation 13. The body portion is bent into a form which is substantially cylindrical, but which at the same time is substantially spiral, due to the fact that the interior diameter is constantly decreasing, as shown particularly in Fig. 2. The end of the body member remote from the said bearing portion 13 is overturned or bent, thereby providing a pocket which serves as a blade-holding means 12, the material of the said body member 10 forming the side walls of the pocket. In order to retain these side walls closely and yet resiliently adjacent each other, lugs 14, preferably integral with the body member 10, are bent upwardly and over the outer wall of the said pocket, whereby the blade 11, which may be of thickness substantially equal to or greater than the width of the said pocket, will be firmly held in position between the side walls thereof.

The device is intended for use as shown particularly in Fig. 1. The cutter blade 11, it will be observed, is on the exterior of the spiral body, and the corrugation 13 is on the inner convolution and projects interiorly. The corrugation, therefore, constitutes a stop to positively engage the finger and is so disposed relatively to the cutter blade, that the cutting action generated by the finger and exerted on the blade, reacts on the finger through the medium of the stop, the result being that the spiral body is caused to wind on the finger and firmly grip the same, therefore most effectively preventing the turning of the device about the finger.

Figure 4:
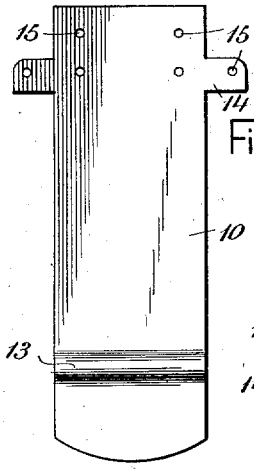

The particular form of the blank shown in Fig. 4 contemplates the continued use of the same blade used with the device even after it has been sharpened a number of times, whereby its width has been materially lessened. The blank shown in this figure is provided with a number of openings 15, those at each side of the blank registering when the parts are folded as shown in Fig. 1; it will be obvious that after the blade has been lessened in width, due to the sharpening and grinding, that the width of the pocket into which the blade fits is too great to permit the cutting edge to project sufficiently. Suitable stops, such as screws or pins, may be inserted in each set of registering openings, thereby providing for engagement with the rear edge portion of the blade, thereby insuring the proper projection of the cutting edge into position for convenient use.

While the cutter has been gotten up especially for the use of fruit and flower pickers, it is, of course, clear that it may be put to a variety of uses, such as cutting twine, thread, etc.

Having thus described my invention, I claim as new, and desire to secure by Letters Patent:

1. A fruit and flower cutter made of a single piece of resilient material, lugs on opposite sides of the said piece of material and spaced from one end thereof, the said end being adapted to be bent adjacent the lugs and the lugs being also adapted to be bent toward each other into engagement with the said bent end, whereby a pocket is formed adapted to receive a blade, the said lugs and the said end portion of the said piece of material being provided with a number of openings adapted for registration, the said openings being adapted to receive elements against which the rear portion of the blade may engage, whereby the cutting edge portion of the blade is removed sufficiently from the said pocket to be available for use.

2. A cutting device of the character described, comprising a tubular body of resilient material having the form of a spiral and adapted to fit the finger of the user, the said body having an exterior cutter on one convolution, and an interiorly projecting stop on another of the convolutions, and so disposed relatively to the cutter that the cutting action generated by the finger on the cutter re-acts on the finger through the said stop, to wind the spiral on the finger.

3. A cutting device of the character described, comprising a tubular spiral body of resilient material adapted to fit the finger of the user, and provided with an exterior cutter, together with means to cause a winding of the spiral on the finger in response to a cutting pressure on the cutter, said means consisting of an interiorly projecting stop adapted to engage the finger in position to resist turning action.

4. A cutting device of the character described, comprising a tubular body of resilient material adapted to fit the finger of the user, said body being in the form of a spiral presenting inner and outer convolutions, there being an exterior cutter on the outer convolution, near one end, and an interiorly projecting stop on the inner convolution near the opposite end of the spiral, the stop being adapted to engage the finger and cause the cutting force to wind the spiral.

5. A cutting device of the character described, comprising a tubular body adapted to fit the finger of the user, the said body having an exterior cutter, and an interiorly projecting finger-engaging stop, the body being in the form of a spiral convolution between the said cutter and stop to cause the resistance of the stop to the cutting action to effect the winding of the spiral.

In testimony whereof I have signed my name to this specification in the presence of two subscribing witnesses.

CHARLES FREDERICK BILLAU.

Witnesses:

ELLA S. MERRIMAN,
WALTER ALLISON.

Copies of this patent may be obtained for five cents each, by addressing the "Commissioner of Patents, Washington, D. C."